(12) United States Patent
Akiyama et al.

(10) Patent No.: US 12,412,308 B2
(45) Date of Patent: Sep. 9, 2025

(54) INFORMATION PROCESSING APPARATUS, INFORMATION PROCESSING TERMINAL, AND INFORMATION PROCESSING METHOD

(71) Applicant: SONY GROUP CORPORATION, Tokyo (JP)

(72) Inventors: Yoshiyuki Akiyama, Tokyo (JP); Shuichi Takahashi, Tokyo (JP); Takuro Kawai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 397 days.

(21) Appl. No.: 17/919,099

(22) PCT Filed: Apr. 9, 2021

(86) PCT No.: PCT/JP2021/014984
§ 371 (c)(1),
(2) Date: Oct. 14, 2022

(87) PCT Pub. No.: WO2021/215268
PCT Pub. Date: Oct. 28, 2021

(65) Prior Publication Data
US 2023/0162399 A1  May 25, 2023

(30) Foreign Application Priority Data
Apr. 23, 2020 (JP) .................. 2020-076711

(51) Int. Cl.
*G06T 7/90* (2017.01)
*G06V 10/75* (2022.01)

(52) U.S. Cl.
CPC .............. *G06T 7/90* (2017.01); *G06V 10/751* (2022.01)

(58) Field of Classification Search
CPC ............. G06T 7/90; G06T 2207/10024; G06T 2207/20081; G06T 2207/20084;
(Continued)

(56) References Cited

U.S. PATENT DOCUMENTS

2003/0048359 A1* 3/2003 Fletcher .................... G06T 5/50
348/E7.086
2018/0296995 A1* 10/2018 Kinnen .................. G06Q 20/18
(Continued)

FOREIGN PATENT DOCUMENTS

| JP | 09-233494 A | 9/1997 |
| JP | 2003-111093 A | 4/2003 |
| WO | 2019/182108 A1 | 9/2019 |

OTHER PUBLICATIONS

International Search Report and Written Opinion of PCT Application No. PCT/JP2021/014984, issued on Jun. 22, 2021, 08 pages of ISRWO.

*Primary Examiner* — Ali Bayat
(74) *Attorney, Agent, or Firm* — CHIP LAW GROUP

(57) ABSTRACT

Provided is an information processing apparatus that calculates a true value of a color of an object shown in a second image obtained by image capture in a user environment, on the basis of a model. Further, the model is created on the basis of a first image obtained by image capture, in the user environment, of an object having a known true value of a color, and represents a correspondence between a color space in the user environment and a color space of the known true value of the color.

14 Claims, 15 Drawing Sheets

(58) Field of Classification Search
CPC ........ G06T 1/00; G06V 10/751; G06V 10/82; G06V 20/60; G06V 10/56; H04N 1/60
USPC ........................................................ 382/100
See application file for complete search history.

(56) References Cited

U.S. PATENT DOCUMENTS

| | | | |
|---|---|---|---|
| 2019/0236406 A1* | 8/2019 | Blatt ...................... | G06V 10/44 |
| 2021/0004989 A1* | 1/2021 | Tanaka ................... | H04N 23/88 |
| 2021/0080727 A1* | 3/2021 | Yamada ................. | G02B 30/22 |
| 2021/0366164 A1* | 11/2021 | Takase ................... | G06T 11/00 |

* cited by examiner

FIG. 5

| SUBJECT NAME | PRODUCT IDENTIFICATION CODE | TRUE VALUE OF REPRESENTATIVE COLOR (XYZ) |
|---|---|---|
| ▼▼ OF ■■ COMPANY: COLOR_◆◆ | AAAAAAAAAA | $X_0Y_0Z_0$ |
| ▼▼ OF ■■ COMPANY: COLOR_×× | BBBBBBBBBB | $X_1Y_1Z_1$ |
| △△ OF ○○ COMPANY: COLOR_◇◇ | CCCCCCCCCC | $X_2Y_2Z_2$ |
| | | |
| | | |

COLOR INFORMATION DB

INFORMATION PROCESSING APPARATUS, INFORMATION PROCESSING TERMINAL, AND INFORMATION PROCESSING METHOD

CROSS REFERENCE TO RELATED APPLICATIONS

This application is a U.S. National Phase of International Patent Application No. PCT/JP2021/014984 filed on Apr. 9, 2021, which claims priority benefit of Japanese Patent Application No. JP 2020-076711 filed in the Japan Patent Office on Apr. 23, 2020. Each of the above-referenced applications is hereby incorporated herein by reference in its entirety.

TECHNICAL FIELD

The present technology particularly relates to an information processing apparatus, an information processing terminal, an information processing method, and a program that make it possible to easily obtain a true value of a color of an object shown in an image.

BACKGROUND ART

There is an increasing number of transactions in places where there is no actual product at hand, such as online shopping. At a time of evaluating a product, a display image displayed on a display is reliable. Typically, an accurate color of a product cannot be recognized from an image displayed on a display.

In a general product image used for online shopping and the like, an original color of a product is often lost since a feature of an image capture environment is unknown or a color is changed by retouch or the like. Therefore, it is difficult for a user to know the original color of the product only from the image displayed on the display.

Patent Document 1 discloses a technique for realizing RGB-XYZ conversion by capturing a color chart as an image.

Patent Document 2 discloses a color management system for reproducing a color of an actual product. In the color management system, color reproduction is achieved by converting a color of an image, by using a monitor profile registered by a user.

CITATION LIST

Patent Document

Patent Document 1: Japanese Patent Application Laid-Open No. H9-233494
Patent Document 2: Japanese Patent Application Laid-Open No. 2003-111093

SUMMARY OF THE INVENTION

Problems to be Solved by the Invention

It is complicated for a user to use the color chart and the monitor profile.

The present technology has been made in view of such a situation, and an object thereof is to easily obtain a true value of a color of an object shown in an image.

Solutions to Problems

An information processing apparatus according to one aspect of the present technology includes: a calculation unit configured to calculate a true value of a color of an object shown in a second image obtained by image capture in a user environment, on the basis of a model that is created on the basis of a first image obtained by image capture, in the user environment, of an object having a known true value of a color, and represents a correspondence between a color space in the user environment and a color space of the known true value of the color.

An information processing terminal according to another aspect of the present technology includes: a transmission unit configured to transmit a second image obtained by image capture of a comparison object that is an object for color comparison, to an information processing apparatus configured to calculate a true value of a color of an object shown in the second image obtained by image capture in a user environment, on the basis of a model created on the basis of a first image obtained by image capture, in the user environment, of an object having a known true value of a color, the model representing a correspondence between a color space in the user environment and a color space of the known true value of the color; and a presentation unit configured to present, to a user, information regarding a color of a target object on the basis of a comparison result between a true value that is of a color of the comparison object and is calculated on the basis of the model and a true value of a color of the target object to be a target of presentation of information regarding a color, the comparison result being obtained by the information processing apparatus.

In one aspect of the present technology, on the basis of a model created on the basis of a first image obtained by image capture, in the user environment, of an object having a known true value of a color, the model representing a correspondence between a color space in the user environment and a color space of the known true value of the color, a true value of a color of an object shown in a second image obtained by image capture in the user environment is calculated.

In another aspect of the present technology, a second image obtained by image capture of a comparison object that is an object for color comparison is transmitted to an information processing apparatus configured to calculate a true value of a color of an object shown in the second image obtained by image capture in a user environment, on the basis of a model created on the basis of a first image obtained by image capture, in the user environment, of an object having a known true value of a color, the model representing a correspondence between a color space in the user environment and a color space of the known true value of the color, and information regarding a color of a target object is presented to a user on the basis of a comparison result between a true value that is of a color of the comparison object and is calculated on the basis of the model and a true value of a color of the target object to be a target of presentation of information regarding a color, the comparison result being obtained by the information processing apparatus.

BRIEF DESCRIPTION OF DRAWINGS

FIG. 5 is a view illustrating an example of information stored in a color information DB.

MODE FOR CARRYING OUT THE INVENTION

Hereinafter, an embodiment for implementing the present technology will be described. The description will be given in the following order.
 1. Color information comparison system
 2. Functional configuration of color information comparison system
 3. Series of operations of color information comparison system
 4. Other <Color Information Comparison System>

Figure 1:
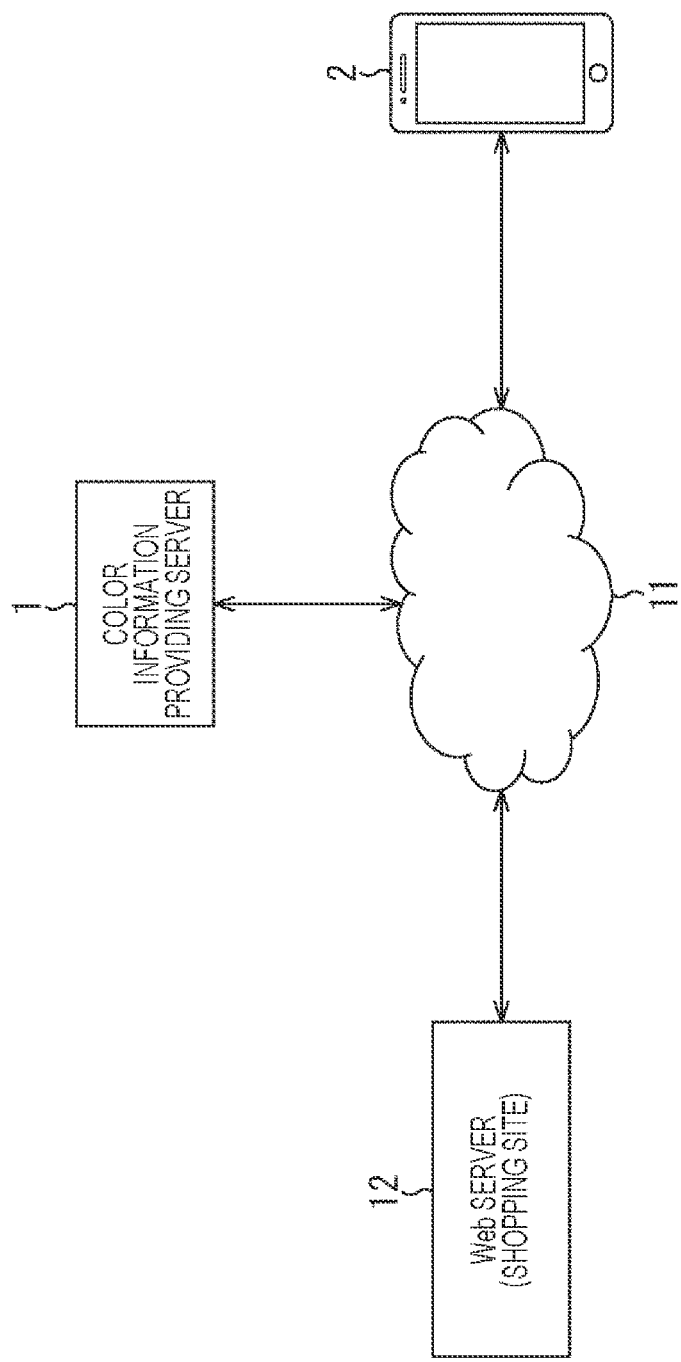
FIG. 1 is a diagram illustrating a configuration example of a color information comparison system according to an embodiment of the present technology.

FIG. 1 is a diagram illustrating a configuration example of a color information comparison system according to an embodiment of the present technology.

The color information comparison system in FIG. 1 is configured by connecting a color information providing server 1 and a mobile terminal 2 via a network 11 such as the Internet.

The color information providing server 1 is an information processing apparatus that provides information regarding a color of a subject shown in an image viewed by a user of the mobile terminal 2 on a display of the mobile terminal 2.

The mobile terminal 2 is an information processing terminal such as a smartphone used by the user. A housing of the mobile terminal 2 is provided with a display, a camera, and the like. The user can operate the mobile terminal 2 to view a screen displayed on the display by using an application such as a web browser, and perform online shopping and the like. Various devices having a display, such as a PC, a tablet terminal, and a TV, may be used instead of the mobile terminal 2.

To the network 11, a web server 12 that manages a shopping site is also connected. In this example, it is assumed that the shopping site managed by the web server 12 is a fashion site that sells clothes. The user of the mobile terminal 2 can browse the shopping site managed by the web server 12, and purchase clothes as a product. In the shopping site managed by the web server 12, images of various products are prepared.

Figure 2:
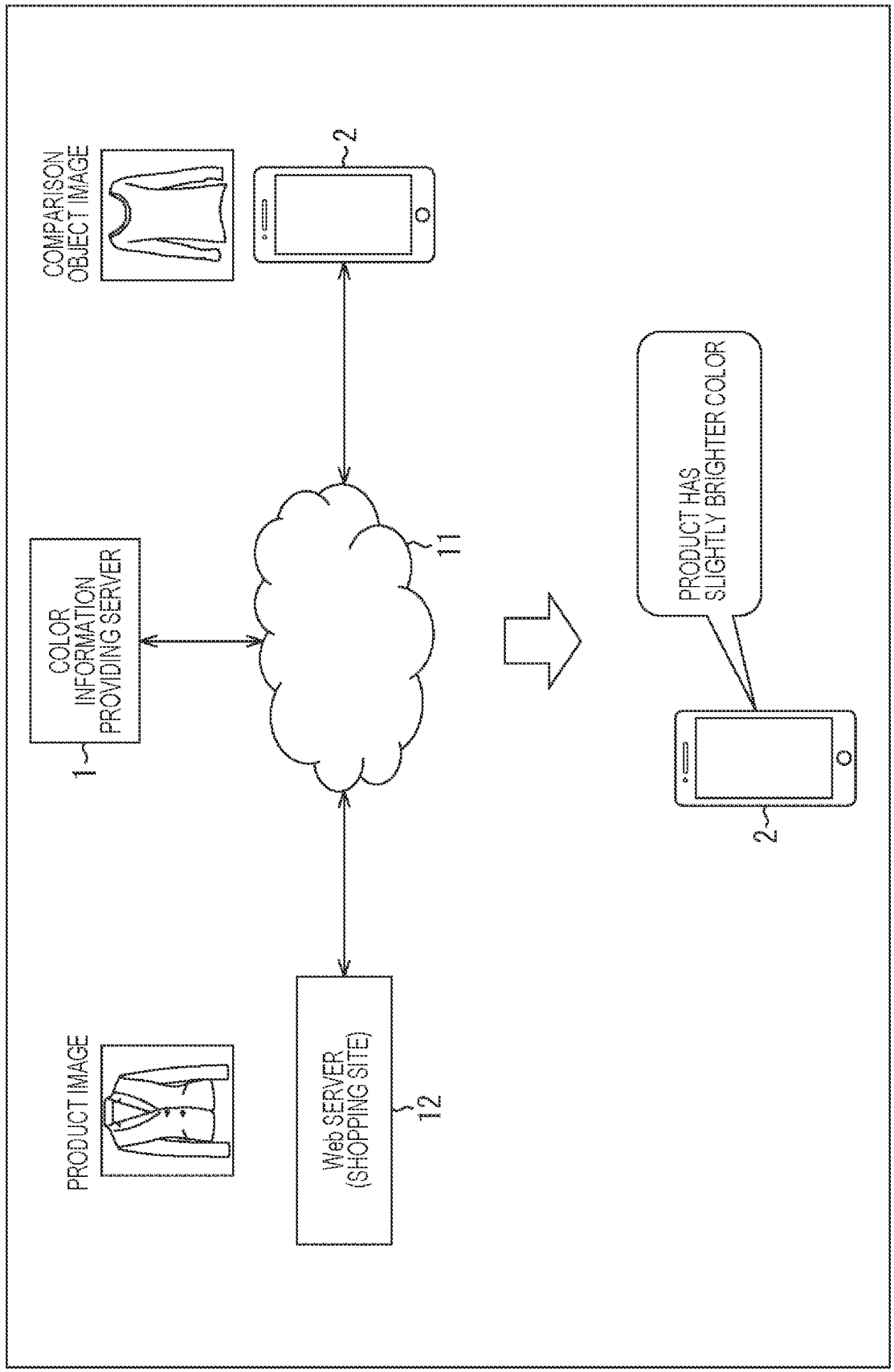
FIG. 2 is a diagram illustrating an example of provision of information regarding a color by a color information providing server.

FIG. 2 is a diagram illustrating an example of provision of information regarding a color by the color information providing server 1.

It is assumed that the user of the mobile terminal 2 selects a predetermined product in the shopping site managed by the web server 12, and views a product image as illustrated on a left side of an upper part of FIG. 2 on the display of the mobile terminal 2. The user uses the shopping site at home, for example.

The product image is an image prepared for publishing on the shopping site, by a seller who is an administrator of the shopping site. In accordance with a way of image capture on the seller side, characteristics of the display, and the like, a color of the product seen on the display of the mobile terminal 2 is different from an original color. The product image is transmitted to the color information providing server 1.

As illustrated on a right side of FIG. 2, the user of the mobile terminal 2 captures an image of a comparison object, which is an object to be compared in color with the product, with the camera of the mobile terminal 2. The comparison object is any object near the user. For example, an image of clothes having a color of a same kind as the product being seen by the user is captured as the comparison object. A comparison object image which is an image of the comparison object captured by the user is transmitted to the color information providing server 1.

In the color information providing server 1, the color of the product is compared with the color of the comparison object on the basis of the product image and the comparison object image, and information regarding the color of the product is presented to the user on the basis of a comparison result. The product shown in the product image is a target object that is to be a target of presentation of the information regarding the color. As the information regarding the color of the product, for example, information about a relative color based on the color of the comparison object is presented.

In the example of FIG. 2, as illustrated in a lower balloon, it is presented to the user that "the product has a slightly brighter color". The presentation to the user may be performed using display on the display or may be performed using sound.

The comparison object is an object that actually exists near the user. The user can picture the original color of the product by comparing with the color of the object that can be directly viewed.

Figure 3:
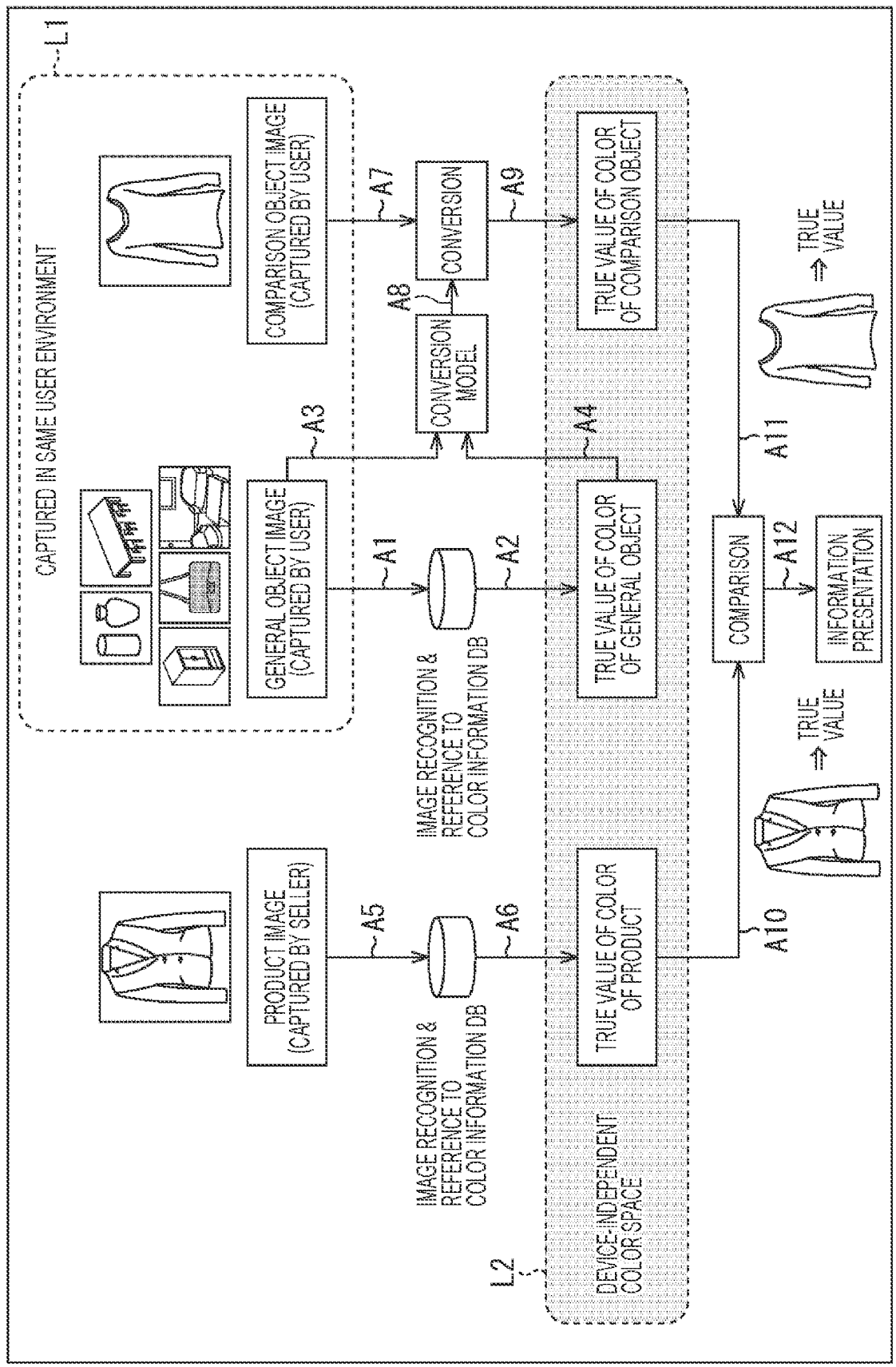
FIG. 3 is a diagram illustrating a flow of color comparison by the color information providing server.

FIG. 3 is a diagram illustrating a flow of color comparison by the color information providing server 1.

With reference to FIG. 3, an overall processing flow by the color information providing server 1 will be described. Details of each process will be described later.

The color information comparison system is a system on the premise that true values of colors of various objects are known and a database (DB) of such known colors is prepared. For example, a color information DB that is a database of true values of colors of various objects is provided in the color information providing server 1.

As illustrated in an upper center of FIG. 3, the user of the mobile terminal 2 captures an image in which a general object, which is a general object at home, is shown. In the example of FIG. 3, a plurality of general object images showing furniture, bags, and the like at home is captured.

The plurality of general object images is transmitted to the color information providing server 1. A color of the general object shown in the general object image captured in an environment of the user of the mobile terminal 2 is a color different from the true value.

In the color information providing server 1, as indicated by a point of an arrow A1, a general object shown as a subject in the general object image is recognized (identified). Furthermore, the color information DB is referred to, and a true value of a color of the general object is obtained as indicated by a point of an arrow A2. The color information DB also stores the true value of the color of the general object.

After the true value of the color of the general object is obtained, in the color information providing server 1, as indicated by points of arrows A3 and A4, a conversion model is created on the basis of the color of the general object shown in the general object image and the true value of the color of the general object. The conversion model is a model used to convert a color of a subject shown in an image captured in an environment of the user of the mobile terminal 2, into a true value of the color. The conversion model is a model for the environment of the user of the mobile terminal 2. Such a conversion model is created before the product color information is provided. Instead of using a plurality of general object images, the conversion model may be created using one general object image.

As illustrated on a left side of FIG. 3, when a product image is inputted in response to selection of a product by the user of the mobile terminal 2, for example, a product shown as a subject in the product image is recognized as indicated by a point of an arrow A5 in the color information providing server 1. Furthermore, the color information DB is referred to, and a true value of a color of the product is obtained as indicated by a point of an arrow A6. The color information DB also stores the true value of the color of the product.

As illustrated on a right side of FIG. 3, when a comparison object image is inputted in response to image capture of the comparison object by the user of the mobile terminal 2, the color of the comparison object shown in the comparison object image is converted into a true value by using the conversion model as indicated by points of arrows A7 and A8, in the color information providing server 1. Since the true value of the color is obtained using the conversion model, the true value of the color of the comparison object is an estimated value. The true value of the color of the comparison object is not stored in the color information DB.

The general object image and the comparative object image are images captured in the same user environment as indicated by a broken line L1, so that the true value of the color of the comparison object image can be obtained (estimated) using the conversion model created using the general object image.

The true value of the color of the product shown in the product image, the true value of the color of the general object shown in the general object image, and the true value of the color of the comparison object shown in the comparison object image, which are surrounded by a broken line L2, are colors in a device-independent color space.

In the color information providing server 1, as indicated by points of arrows A10 and A11, the true value of the color of the product is compared with the true value of the color of the comparison object, and information about the color of the product is presented to the user on the basis of a comparison result, as indicated by a point of an arrow A12.

In this way, in the color information comparison system, a correspondence between a color space of the user environment and the device-independent color space that is a color space of a true value of a color is constructed as the conversion model, on the basis of a general object image showing a general object existing in the user environment and having a true value of a color in the color information DB. By using the conversion model, a true value of a color of any comparison object can be obtained, and comparison with the color of the product can be performed.

Since special equipment for calibration such as a color chart is unnecessary, the color information providing server 1 can easily provide information regarding a color of a product. Furthermore, since a true value of a color of a comparison object is obtained using the conversion model for the user environment, the color information providing server 1 can compare the color of the product with the color of the object owned by the user with high accuracy.

That is, the color information providing server 1 can easily obtain a true value of a color of each of the product and the comparison object with high accuracy, and provide information regarding the color of the product.

As a method of achieving accurate color display, there is a method of transferring information by using special equipment on an image capture side and a display side, such as a method using multi-band image capture. However, it is not realistic for both the selling side and the buying side (the user) to prepare the special equipment to make a transaction.

Furthermore, there is a method of performing color calibration by using a color chart or the like. In order to easily know an accurate color, it is desirable not to use special equipment such as a color chart.

According to the color information comparison system, it is not necessary for both the selling side and the buying side to prepare special equipment or use special equipment such as a color chart.

<Functional Configuration of Color Information Comparison System>

Figure 4:
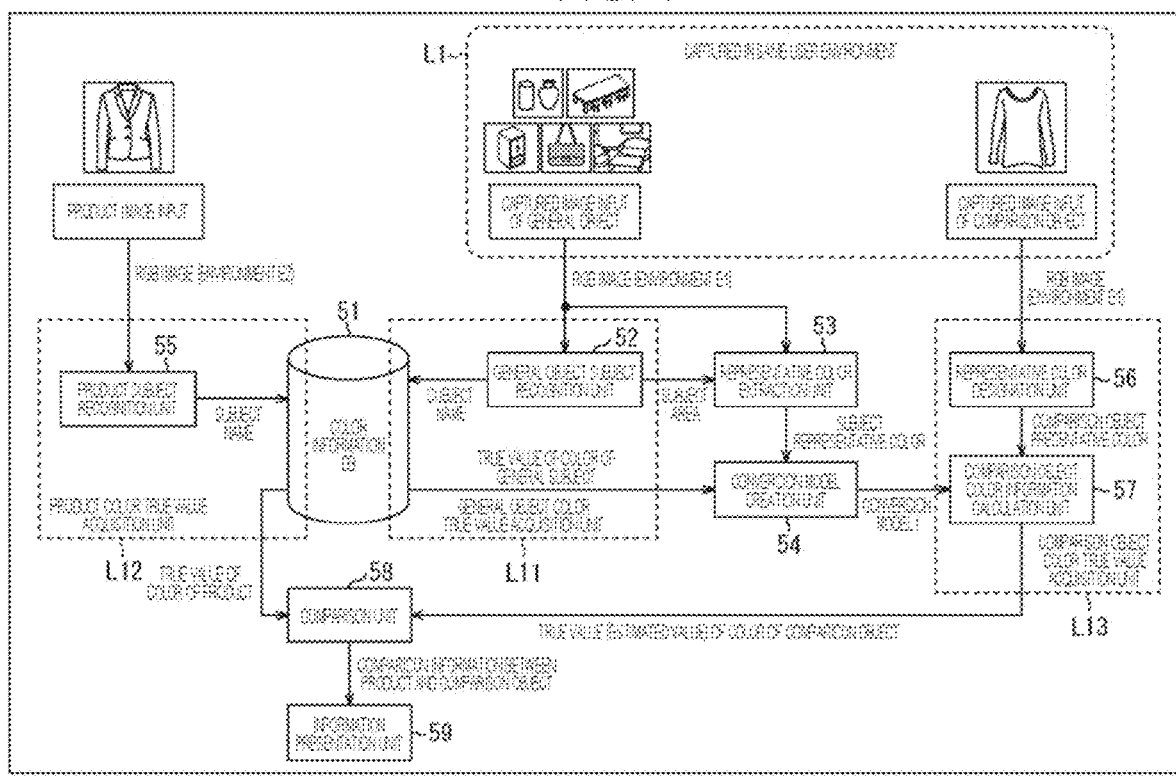
FIG. 4 is a block diagram illustrating a functional configuration example of the color information comparison system.

FIG. 4 is a block diagram illustrating a functional configuration example of the color information comparison system.

The color information comparison system includes a color information DB 51, a general object subject recognition unit 52, a representative color extraction unit 53, a conversion model creation unit 54, a product subject recognition unit 55, a representative color designation unit 56, a comparison object color information calculation unit 57, a comparison unit 58, and an information presentation unit 59.

A general object image captured by the user of the mobile terminal 2 is inputted to the general object subject recognition unit 52 and the representative color extraction unit 53, and a product image prepared by a seller is inputted to the product subject recognition unit 55. To the representative color designation unit 56, a comparison object image captured by the user of the mobile terminal 2 is inputted.

All of the general object image, the product image, and the comparison object image are RGB images. The general object image and the comparison object image are RGB images depending on the user environment (an environment E1) of the user of the mobile terminal 2. The product image is an RGB image depending on an environment (an environment E2) on the seller side.

The color information DB 51 is a database that stores true values of colors of various objects. The color information DB 51 stores at least a true value of a color of a general object and a true value of a color of a product.

FIG. 5 is a view illustrating an example of information stored in the color information DB 51.

As illustrated in FIG. 5, the color information DB 51 stores a true value of a representative color in association with a subject name and a product identification code. In the example of FIG. 5, the subject name of each product is information obtained by combining a company name of a sales source of the product, a product name, and a color.

As described above, in the color information DB 51, information about each product is listed and managed. Similarly, for a general object, a true value of a representative color is stored in association with a subject name and a product identification code.

Note that the representative color is a single color that is considered to most represent likelihood of the subject. The representative color is determined when the true value of the color is registered. For example, a true value of a color is represented by tristimulus values XYZ under a standard light source (D65) defined by the International Commission on Illumination (CIE). The true value of the color may be represented by other elements such as hue, brightness, and saturation.

The general object subject recognition unit 52 in FIG. 4 analyzes the inputted general object image, and recognizes a general object shown as a subject. The subject recognition by the general object subject recognition unit 52 is realized by, for example, image recognition using a deep neural network (DNN). In the general object subject recognition unit 52, an inference model is prepared such as a DNN in which a general object image is used as an input and a subject area and a subject name are used as an output.

Subject area information indicating a position of an area in which the subject is shown on the general object image is supplied to the representative color extraction unit 53. The position of the area in which the subject is shown is represented by coordinates with respect to a rectangle such as a bounding box, or a label map in units of pixels such as semantic segmentation.

Furthermore, the general object subject recognition unit 52 refers to the color information DB 51, and acquires a true value of a color of the general object on the basis of the subject name of the general object. The true value of the color of the general object acquired by the general object subject recognition unit 52 is supplied to the conversion model creation unit 54. As indicated by a broken line L11, the color information DB 51 and the general object subject recognition unit 52 realize a general object color true value acquisition unit that acquires a true value of a color of a general object.

The representative color extraction unit 53 extracts a representative color of a general object shown in the general object image, on the basis of the general object image and the subject area information.

Figure 6A:
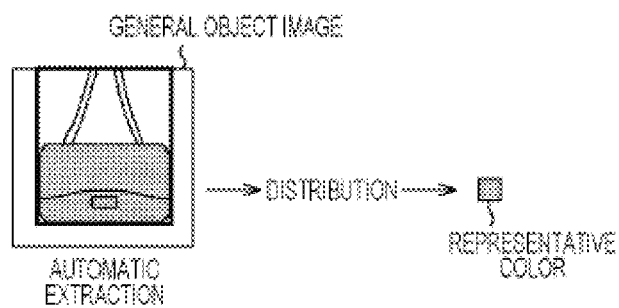
FIGS. 6A and 6B are diagrams illustrating an example of extraction of a representative color.

For example, as illustrated in of FIG. 6A, the representative color extraction unit 53 determines pixels constituting an area in which a general object is shown as calculation target pixels, on the basis of the subject area information. In the example of FIG. 6A, pixels constituting a rectangular area in which a bag as a general object is shown are determined as calculation target pixels, on the basis of the subject area information.

Furthermore, the representative color extraction unit 53 extracts the representative color by, for example, calculating a barycenter in a color distribution or the like with reference to a color distribution or the like of the calculation target pixels. The color of the barycenter of the subject area may be extracted as the representative color.

Figure 6B:
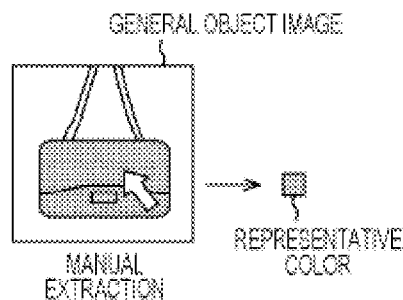

As illustrated in FIG. 6B, the representative color may be manually extracted. In this case, the representative color is extracted such that, for example, a color at a position freely designated by the user on the general object image is set as the representative color. That is, when the representative color is manually extracted, the subject area information supplied from the general object subject recognition unit 52 is not used.

The representative color may be manually extracted when it is determined that the representative color automatically extracted using the subject area information is not appropriate. Any method of extracting the representative color may be adopted, such as using an average value of a color of the general object as the representative color.

The information about the representative color extracted by the representative color extraction unit 53 is supplied to the conversion model creation unit 54.

The conversion model creation unit 54 creates a conversion model for the user environment of the user of the mobile terminal 2, on the basis of the true value of the color of the general object acquired by the general object subject recognition unit 52 and the representative color extracted by the representative color extraction unit 53.

Here, the user environment is determined by factors such as: an image capture device such as a camera used by the user of the mobile terminal 2; setting of image capture parameters such as an exposure time and a shutter speed; a type and intensity of illumination light, and a relative positional relationship between a subject and the user who captures an image.

Figure 7:
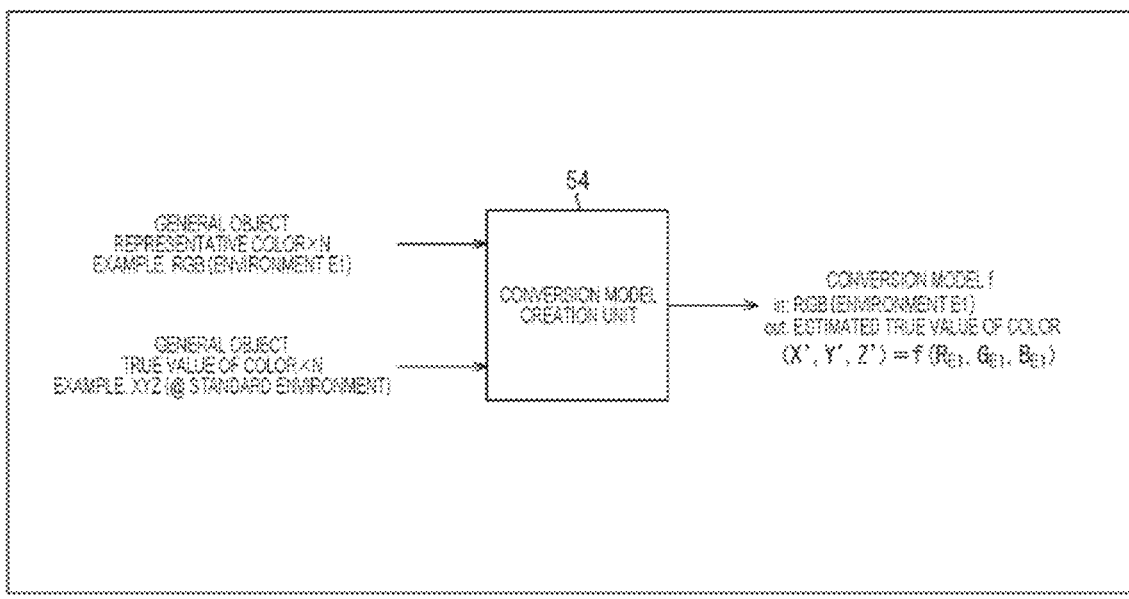
FIG. 7 is a diagram illustrating an example of an input and an output to a conversion model creation unit.

FIG. 7 is a diagram illustrating an example of an input and an output to the conversion model creation unit 54.

As illustrated in FIG. 7, representative colors and true values of colors for a plurality of (N) general objects are inputted to the conversion model creation unit 54. The representative color of the general object is a color on an RGB space of the user environment. The true value of the color of the general object is a color represented by tristimulus values XYZ in a standard environment (an environment under a standard light source).

The conversion model creation unit 54 creates a conversion model f by using a plurality of data pairs of the representative color and the true value.

The conversion using the conversion model f is expressed by the following Equation (1).

[Formula 1]

$$(X', Y', Z') = f(R_{E1}, G_{E1}, B_{E1}) \quad (1)$$

In Equation (1), X', Y', and Z' represent true values of a color estimated by the conversion model f. Furthermore, $R_{E1}$, $G_{E1}$, and $B_{E1}$ represent RGB values of a representative color of a general object in a user environment.

As the conversion model f, it is possible to use an inference model such as a DNN having $R_{E1}$, $G_{E1}$, and $B_{E1}$ as inputs and X', Y', and Z' as outputs. In this case, the conversion model creation unit 54 creates the conversion model f by learning coefficients of individual layers by using a true value group of a color of the general object as teacher data and a representative color group of the general object as student data. A configuration of a network in which the conversion model f is formed is freely set in consideration of conversion accuracy and a calculation amount.

Instead of an inference model such as the DNN, the conversion model may be configured by a conversion matrix M of 3×3 (three rows and three columns). The conversion matrix M is a matrix that converts representative colors $R_i$, $G_i$, and $B_i$ of the general object into true values of the color $X'_i$, $Y'_i$, and $Z'_i$ as in the following Equation (2). A subscript i takes a value of 1 to N.

[Formula 2]

$$\begin{bmatrix} X'_i \\ Y'_i \\ X'_i \end{bmatrix} = \begin{bmatrix} & M & \end{bmatrix} \begin{bmatrix} R_i \\ G_i \\ B_i \end{bmatrix} \quad (2)$$

In this case, as expressed in the following Equation (3), the conversion model creation unit 54 determines the conversion matrix M so as to obtain a matrix having a minimum square sum S of differences between the true values $X_i$, $Y_i$, and $Z_i$ and the estimated true values $X'_i$, $Y'_i$, and $Z'_i$ in the respective XYZ components of a number of samples N. It is possible to improve the conversion accuracy by adding various conditions or the like.

[Formula 3]

$$S = \sum_{i=1}^{N} \{(X_i - X'_i)^2 + (Y_i - Y'_i)^2 + (Z_i - Z'_i)^2\} \quad (3)$$

Furthermore, it is also possible to use a look up table in which $R_{E1}$, $G_{E1}$, and $B_{E1}$ are associated with X', Y', and Z', as the conversion model f.

The conversion model creation unit 54 outputs the conversion model f created in this manner, to the comparison object color information calculation unit 57.

The product subject recognition unit 55 in FIG. 4 analyzes a product image inputted in accordance with an operation of the user of the mobile terminal 2, and recognizes a product shown as a subject. Subject recognition by the product subject recognition unit 55 is realized by, for example, image recognition using the DNN. In the product subject recognition unit 55, an inference model is prepared, such as a DNN having a product image as an input and a subject name, which is a product name, as an output.

The product subject recognition unit 55 refers to the color information DB 51, and acquires a true value of a color of the product on the basis of the subject name of the product. The true value of the color of the product acquired by the product subject recognition unit 55 is supplied to the comparison unit 58. As indicated by a broken line L12, the color information DB 51 and the product subject recognition unit 55 realize a product color true value acquisition unit that acquires a true value of a color of a product.

When a comparison object image is inputted in response to image capture of a comparison object by the user of the mobile terminal 2, the representative color designation unit 56 causes the user to designate a color to be the representative color. For example, the comparison object image is presented to the user, and the representative color is designated by designating a position on the comparison object close to the color of the product. The representative color designation unit 56 outputs the color designated by the user as the representative color of the comparison object, to the comparison object color information calculation unit 57.

Similarly to the representative color of the general object, the representative color of the comparison object may be automatically extracted on the basis of the comparison object image.

The comparison object color information calculation unit 57 converts the representative color of the comparison object into a true value, by using the conversion model f created by the conversion model creation unit 54. The comparison object color information calculation unit 57 outputs the true value of the color calculated by the conversion by using the conversion model f to the comparison unit 58, as the true value of the color of the comparison object. As indicated by a broken line L13, by the representative color designation unit 56 and the comparison object color information calculation unit 57, a comparison object color true value acquisition unit that acquires a true value of a color of a comparison object is realized.

The comparison unit 58 compares the true value of the color of the product acquired by the product subject recognition unit 55 with the true value of the color of the comparison object calculated by the comparison object color information calculation unit 57. The comparison unit 58 outputs information indicating a comparison result to the information presentation unit 59, and causes presentation of the comparison information to the user.

On the basis of the information supplied from the comparison unit 58, the information presentation unit 59 presents, to the user, comparison information indicating a comparison result between the true value of the color of the product and the true value of the color of the comparison subject. To present the comparison information, a display, a speaker, or the like of the mobile terminal 2 is used.

Here, a presentation example of the comparison information will be described.

Presentation by Characters

The information presentation unit 59 controls to display characters representing the comparison result on the display, such as "the product is slightly brighter and slightly blue". This presentation is to present a relative color of the product with respect to the color of the comparison object as a reference.

The information presentation unit 59 controls to display a numerical value representing the true value of the color of the product and a numerical value representing the true value of the color of the comparison subject. Furthermore, the information presentation unit 59 controls to display a difference between these true values as a numerical value.

Presentation by Color

The information presentation unit 59 converts the true value of the color of the product and the true value of the color of the comparison subject into RGB values in a standard color space, and controls to display the RGB values in colors on the display.

Presentation by Image

The information presentation unit 59 converts each of the product image and the comparison object image into an image having the representative color according to the true value, and controls to display the image on the display.

Presentation by Sound

The information presentation unit 59 causes the speaker to output sound representing the comparison result.

The information presentation unit 59 adjusts magnitude, intensity, frequency characteristics, and the like of the sound on the basis of a rule assigned in advance, and causes the speaker to output sound indicating the comparison result.

Presentation by Motion

The information presentation unit 59 presents a difference between the true value of the color of the product and the true value of the color of the comparison subject by motion assigned in advance. In this case, when the product is slightly bright, the information presentation unit 59 performs control for causing the mobile terminal 2 to generate motion such as shaking slightly.

Presentation by Plotting in Chromaticity Diagram and Color Space

The information presentation unit 59 individually plots and presents the true value of the color of the product and the true value of the color of the comparison subject on a two-dimensional chromaticity diagram or a three-dimensional color space displayed on the display.

Presentation by Searching Color Information DB 51 for Object Having Close Color The information presentation unit 59 searches the color information DB 51 for a general object having a color close to the color of the product, and presents the general object obtained as a search result in an image, a text, sound, or the like.

This presentation is performed when there is a general object having a color close to the true value of the color of the product among general objects whose images are captured by the user for creating the conversion model f. For example, presentation such as "the color of your oo is close to the color of the product" is performed.

Presentation by Searching Object Having Close Color in Real Time

This presentation is performed in real time, for example, when the user of the mobile terminal 2 captures a moving image in the user environment, and the captured moving image is displayed on the display of the mobile terminal 2 in a live view format. When there is an object having a color close to the color of the product among objects shown in the moving image, as illustrated in FIG. 8, information indicating which object is an object having a color close to the color of the product is displayed on the moving image displayed in the live view format.

Figure 8:
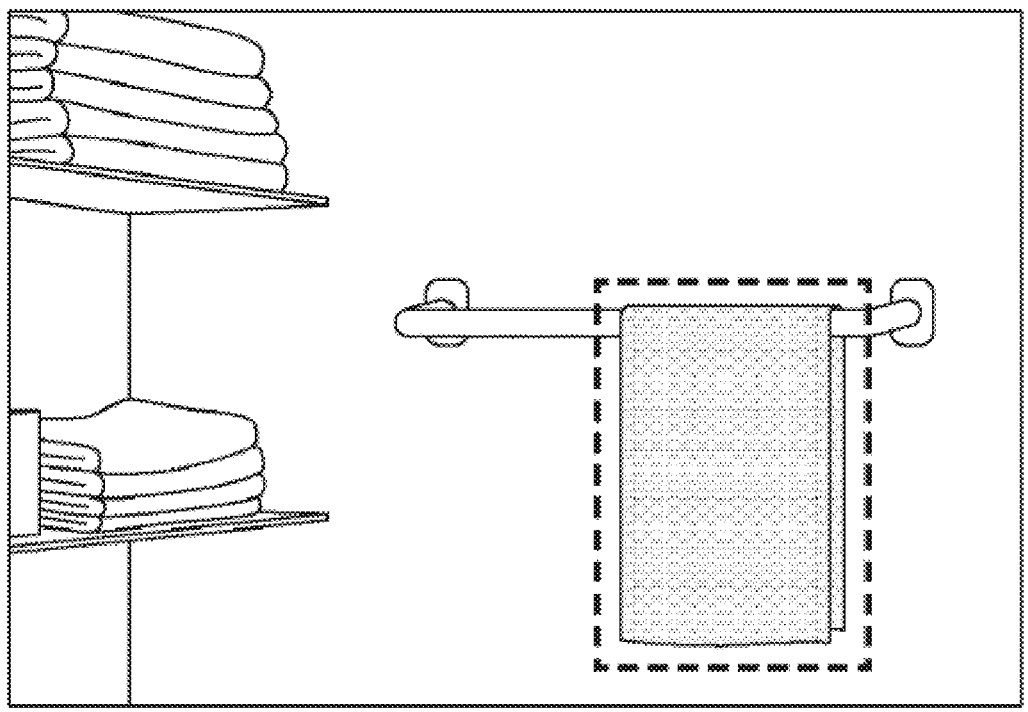
FIG. 8 is a view illustrating a presentation example of comparison information.

In the example of FIG. 8, a towel hung on a towel hanger installed on a wall is an object having a color close to the color of the product, and the towel is emphasized by being surrounded by a frame. The user can know which object is the object having the color close to the color of the product, by image capture of surroundings of the user with the camera of the mobile terminal 2.

Since the conversion model f is prepared in advance, such a true value of a color of an object existing in the user environment can be estimated in real time and presented to the user.

In this manner, the moving image can be used as the comparison object image.

Figure 9:
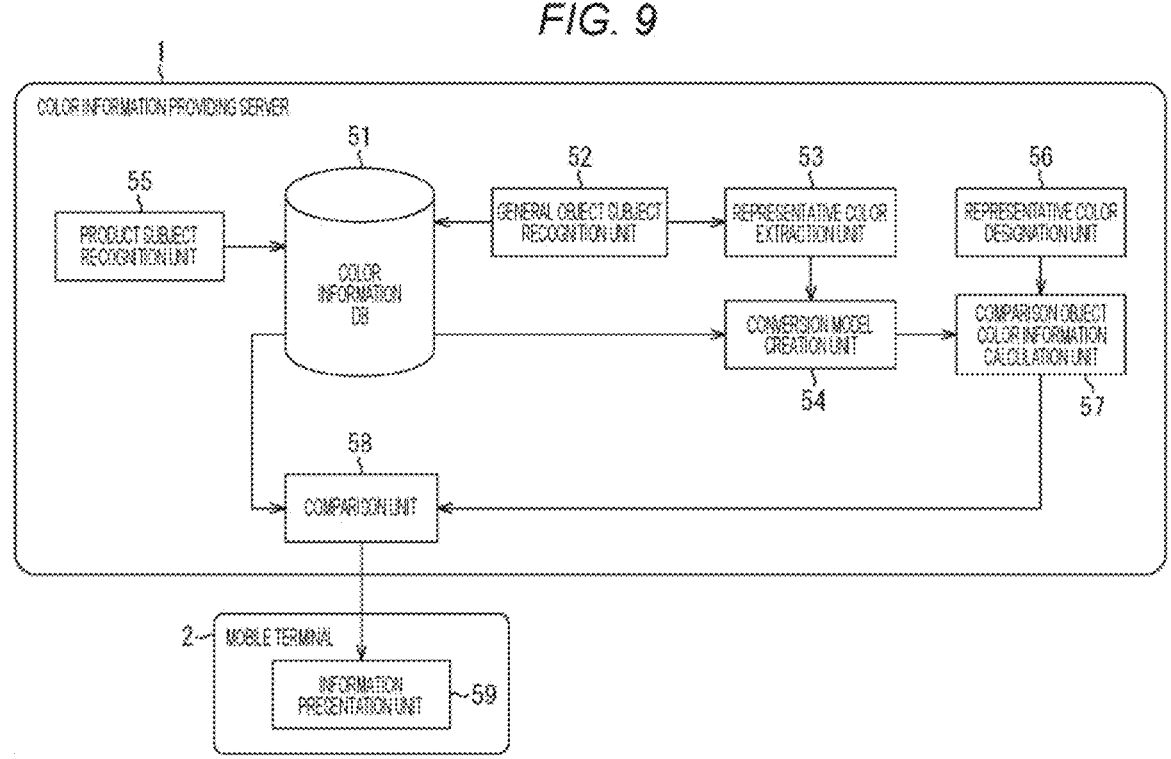
FIG. 9 is a diagram illustrating an implementation example of each configuration.

FIG. 9 is a diagram illustrating an implementation example of each configuration.

The color information DB 51, the general object subject recognition unit 52, the representative color extraction unit 53, the conversion model creation unit 54, the product subject recognition unit 55, the representative color designation unit 56, the comparison object color information calculation unit 57, and the comparison unit 58 having the individual functions as described above are, for example, provided in the color information providing server 1. Furthermore, the information presentation unit 59 is provided in the mobile terminal 2.

Hereinafter, a series of operations of the color information comparison system realized by the color information providing server 1 and the mobile terminal 2 each having the configuration illustrated in FIG. 9 will be described.

<Series of Operations of Color Information Comparison System>

Operation of Color Information Providing Server 1

Figure 10:
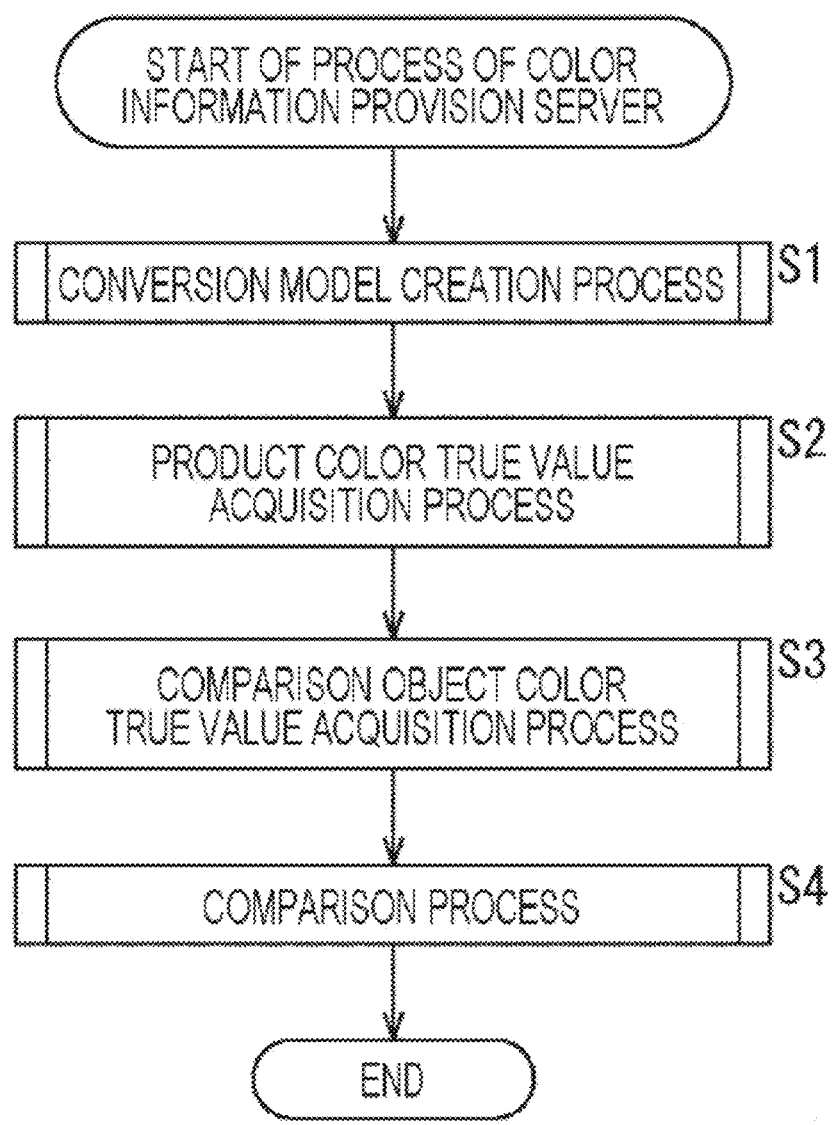
FIG. 10 is a flowchart illustrating a process of the color information providing server.

First, with reference to a flowchart of FIG. 10, a process of the color information providing server 1 will be described.

In step S1, the color information providing server 1 performs a conversion model creation process, which is a process of creating the conversion model f. Details of the conversion model creation process will be described later with reference to a flowchart of FIG. 11.

In step S2, the color information providing server 1 performs a product color true value acquisition process, which is a process of acquiring a true value of a color of a product. Details of the product color true value acquisition process will be described later with reference to a flowchart of FIG. 12.

In step S3, the color information providing server 1 performs a comparison object color true value acquisition process, which is a process of acquiring a true value of a color of a comparison object. Details of the comparison object color true value acquisition process will be described later with reference to a flowchart of FIG. 13.

In step S4, the color information providing server 1 performs a comparison process, which is a process of comparing a true value of a color of a product with a true value of a color of a comparison object. Details of the comparison process will be described later with reference to a flowchart of FIG. 14.

Figure 11:
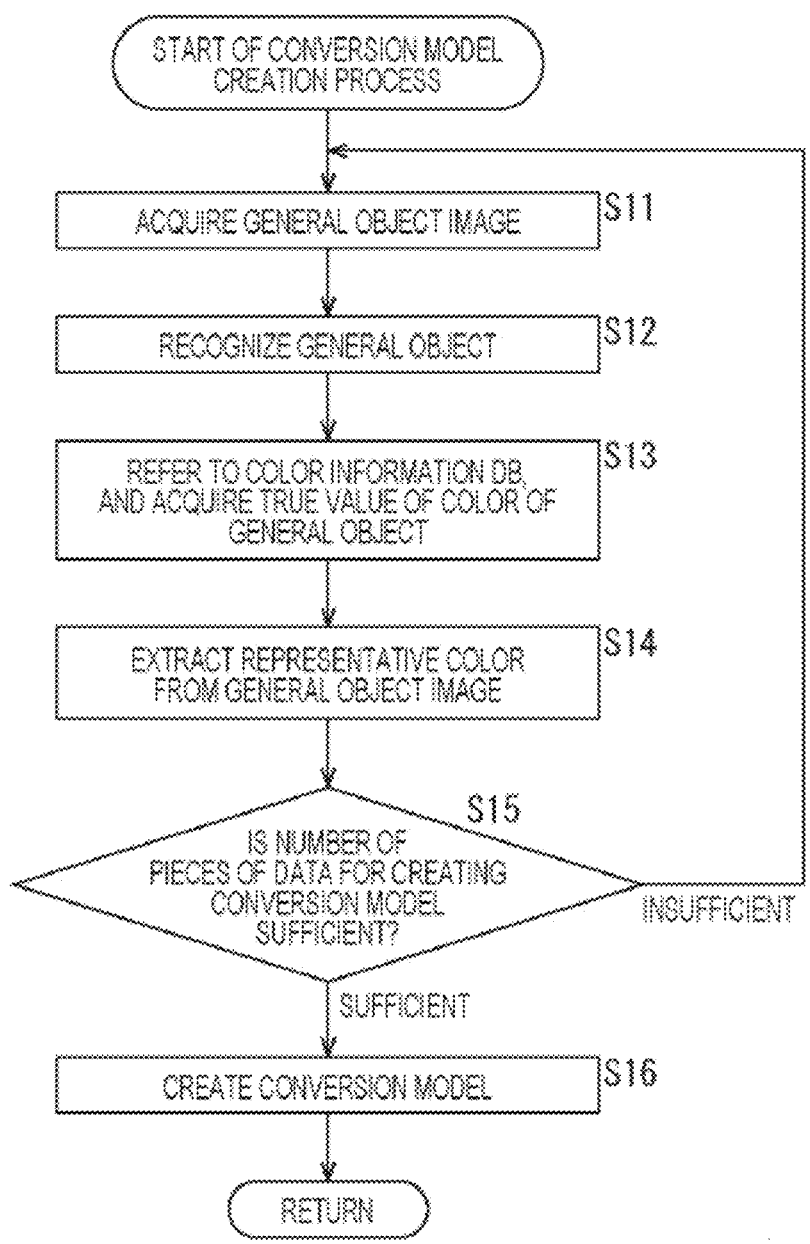
FIG. 11 is a flowchart illustrating a conversion model creation process performed in step S1 in FIG. 10.

Next, the conversion model creation process performed in step S1 of FIG. 10 will be described with reference to the flowchart of FIG. 11. The process of FIG. 11 is started, for example, when a general object image captured by the user of the mobile terminal 2 is transmitted.

In step S11, the general object subject recognition unit 52 acquires a general object image transmitted from the mobile terminal 2.

In step S12, the general object subject recognition unit 52 analyzes the general object image, and recognizes a general object shown as a subject. By image recognition using the DNN, a subject area and a subject name are recognized.

In step S13, the general object subject recognition unit 52 refers to the color information DB 51, and acquires a true value of a color of the general object on the basis of the subject name of the general object.

In step S14, the representative color extraction unit 53 extracts a representative color of the general object from the general object image on the basis of subject area information.

In step S15, the conversion model creation unit 54 determines whether or not a number of pieces of data for creating the conversion model f is sufficient. When it is determined in step S15 that the number of pieces of data for creating the conversion model f is insufficient, the process returns to step S11, and the above process is repeated.

When it is determined in step S15 that the number of pieces of data for creating the conversion model f is sufficient since a sufficient number of data pairs of a representative color and a true value of a color of a general object have been acquired, the process proceeds to step S16.

In step S16, the conversion model creation unit 54 creates the conversion model f by performing learning or the like using a true value group of the color of the general object as teacher data and a representative color group of the general object as student data. Thereafter, the process returns to step S1 in FIG. 10, and the subsequent process is performed. The conversion model f created by the conversion model creation process is supplied to the comparison object color information calculation unit 57.

Figure 12:
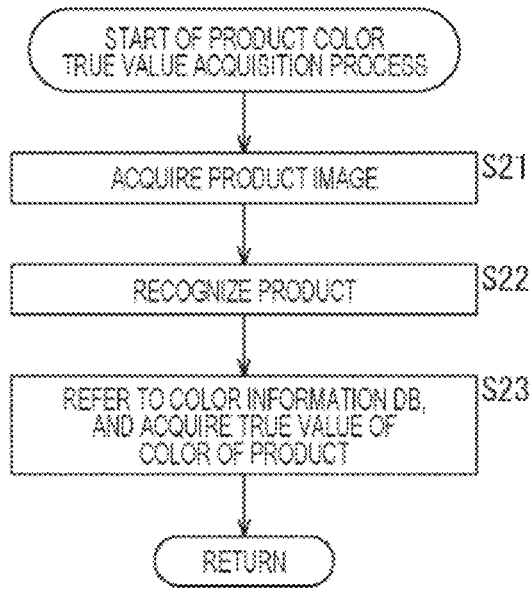
FIG. 12 is a flowchart illustrating a product color true value acquisition process performed in step S2 in FIG. 10.

With reference to the flowchart of FIG. 12, the product color true value acquisition process performed in step S2 of FIG. 10 will be described. The process of FIG. 12 is started, for example, when the user of the mobile terminal 2 browses a product image of a product to be purchased and the product image is transmitted.

In step S21, the product subject recognition unit 55 acquires a product image.

In step S22, the product subject recognition unit 55 analyzes the product image and recognizes a product shown as a subject. By image recognition using the DNN, a subject name is recognized.

In step S23, the product subject recognition unit 55 refers to the color information DB 51, and acquires a true value of a color of the product on the basis of the subject name of the product. Thereafter, the process returns to step S2 in FIG. 10, and the subsequent process is performed. The true value of the color of the product acquired by the product color true value acquisition process is supplied to the comparison unit 58.

Figure 13:
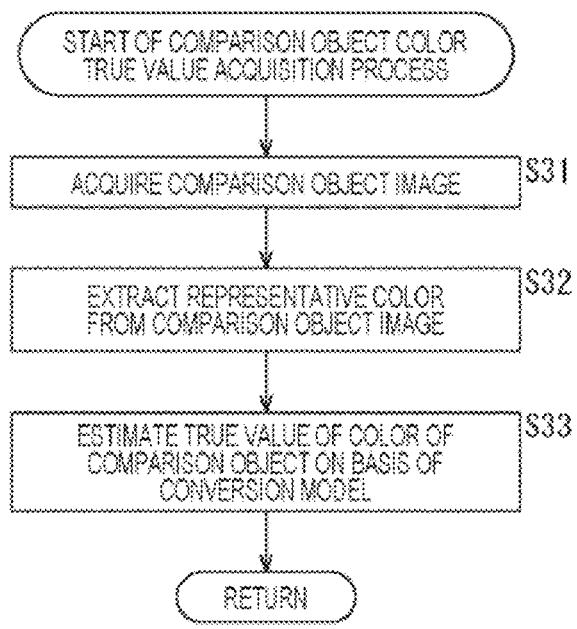
FIG. 13 is a flowchart illustrating a comparison object color true value acquisition process performed in step S3 of FIG. 10.

With reference to the flowchart of FIG. 13, the comparison object color true value acquisition process performed in step S3 of FIG. 10 will be described. The process of FIG. 13 is started, for example, when a comparison object image is transmitted from the mobile terminal 2 in response to image capture of a comparison object by the user of the mobile terminal 2.

In step S31, the representative color designation unit 56 acquires a comparison object image.

In step S32, the representative color designation unit 56 extracts a color of a comparison object as the representative color from the comparison object image, by causing the user to designate a color.

In step S33, the comparison object color information calculation unit 57 estimates a true value of the color of the comparison object, by performing conversion of the representative color on the basis of the conversion model f. Thereafter, the process returns to step S3 in FIG. 10, and the subsequent process is performed. The true value of the color of the comparison object estimated by the comparison object color true value acquisition process is supplied to the comparison unit 58.

Figure 14:
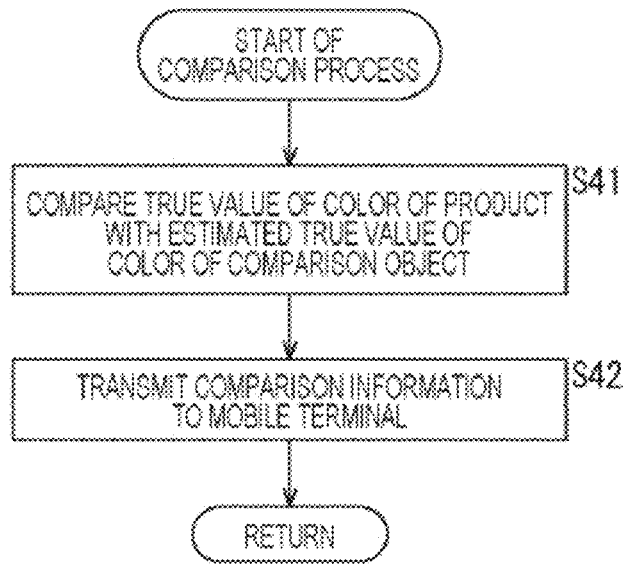
FIG. 14 is a flowchart illustrating a comparison process performed in step S4 in FIG. 10.

With reference to the flowchart of FIG. 14, the comparison process performed in step S4 of FIG. 10 will be described.

In step S41, the comparison unit 58 compares the true value of the color of the product acquired by the product color true value acquisition process with the true value of the color of the comparison object estimated by the comparison object color true value acquisition process.

In step S42, the comparison unit 58 transmits comparison information indicating a comparison result, to the mobile terminal 2. Thereafter, the process returns to step S4 in FIG. 10, and the process of the color information providing server 1 ends.

Operation of Mobile Terminal 2

Figure 15:
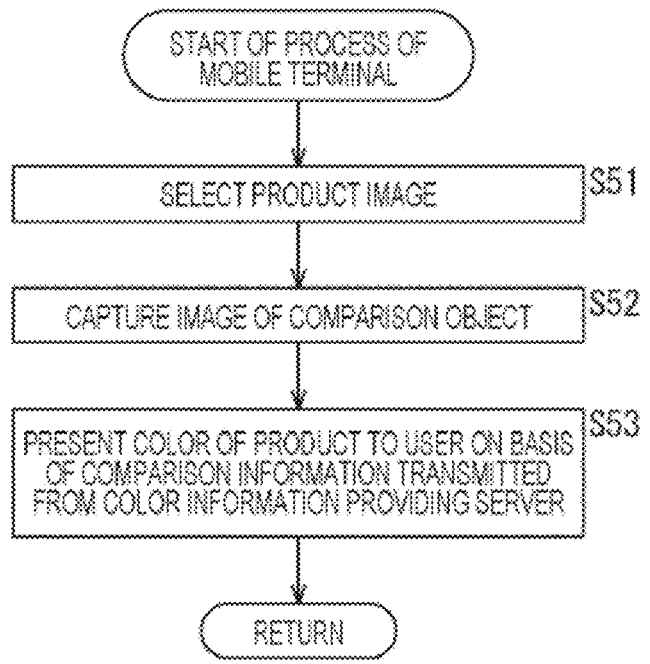
FIG. 15 is a flowchart illustrating a process of a mobile terminal.

Next, with reference to a flowchart of FIG. 15, a process of the mobile terminal 2 will be described.

The process of the mobile terminal 2 is performed after the process described with reference to FIG. 11 is performed by the color information providing server 1, and the conversion model f is created.

In step S51, the mobile terminal 2 selects a product image in accordance with an operation by the user. The selected product image is transmitted to the color information providing server 1, and a product color true value acquisition process (FIG. 12) is performed.

In step S52, the mobile terminal 2 captures an image of a comparison object in accordance with an operation of the user. The captured comparison object image is transmitted to the color information providing server 1, and the comparison object color true value acquisition process (FIG. 13) is performed. After the comparison object color true value acquisition process, the comparison process (FIG. 14) is performed, and the comparison information is transmitted from the color information providing server 1 to the mobile terminal 2.

In step S53, the information presentation unit 59 of the mobile terminal 2 presents a color of the product to the user on the basis of the comparison information transmitted from the color information providing server 1, and ends the process.

Through the series of processes described above, it is possible to easily and highly accurately obtain a true value of a color of each of the product and the comparison object, and to provide information regarding the color of the product.

Note that, although the object to be the target of presentation of information regarding a color is clothes, various objects other than clothes for which the user confirms a color on the display can be the target.

<Others>

Estimation of Appearance in Different Environments

In the example described above, true values of colors are recorded in the color information DB 51 as values under standard illumination such as D65 which is general daylight. As long as the conversion model f has been created, it is possible to estimate a normal appearance (an appearance under standard illumination) of any object regardless of an image capture environment.

By using this, for example, it is possible to estimate how an object shown in an image captured in the evening looks in the daytime. As a result, it becomes possible to improve the ease of recognition of the user.

Estimating how an object shown in an image captured in the evening looks in the daytime can be applied to, for example, display of an image (a video image) captured by an in-vehicle camera or a monitoring camera. By converting an image captured by an in-vehicle camera or the like into an image of a standard environment by using a conversion model, it is possible to display an image in which a user can easily recognize a scene or an object.

Selective Use of Plurality of Conversion Models

The user environment is not always constant. For example, even in the same room, different conversion models are required to obtain images under the same standard illumination, in a case of image capture in the daytime and in a case of image capture under fluorescent light at night.

The conversion model may be created and stored for each difference in user environment. In this case, a plurality of conversion models is switched and used in accordance with an environment at a time of capturing an image to be converted.

Modified Example of Configuration

In the above, the color information DB 51, the general object subject recognition unit 52, the representative color extraction unit 53, the conversion model creation unit 54, the product subject recognition unit 55, the representative color designation unit 56, the comparison object color information calculation unit 57, and the comparison unit 58 are provided in the color information providing server 1, and the information presentation unit 59 is provided in the mobile terminal 2. However, a combination of the configuration provided in the color information providing server 1 and the configuration provided in the mobile terminal 2 can be appropriately changed.

Figure 16:
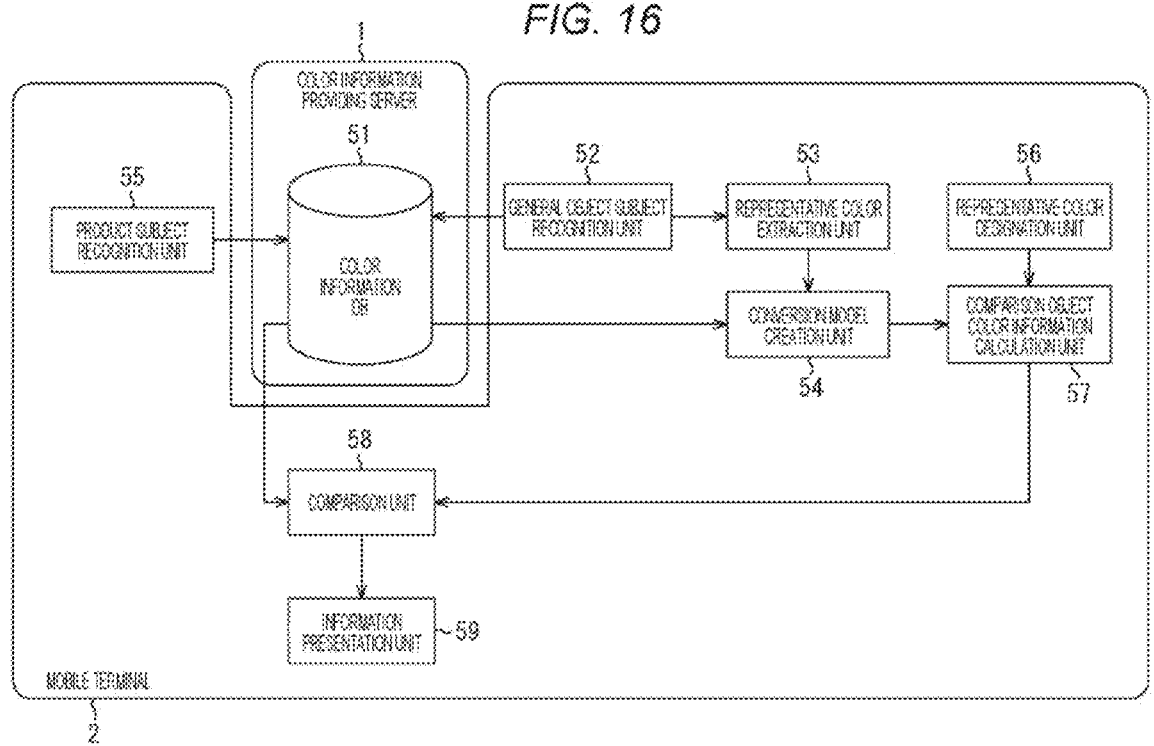
FIG. 16 is a diagram illustrating another implementation example of each configuration.

FIG. 16 is a diagram illustrating another implementation example of each configuration.

For example, as illustrated in FIG. 16, only the color information DB 51 may be provided in the color information providing server 1, and other configurations may be provided in the mobile terminal 2. When a program is individually executed by a CPU of a computer included in the color information providing server 1 and a CPU included in the mobile terminal 2, each configuration is realized in the color information providing server 1 and the mobile terminal 2.

Figure 17:
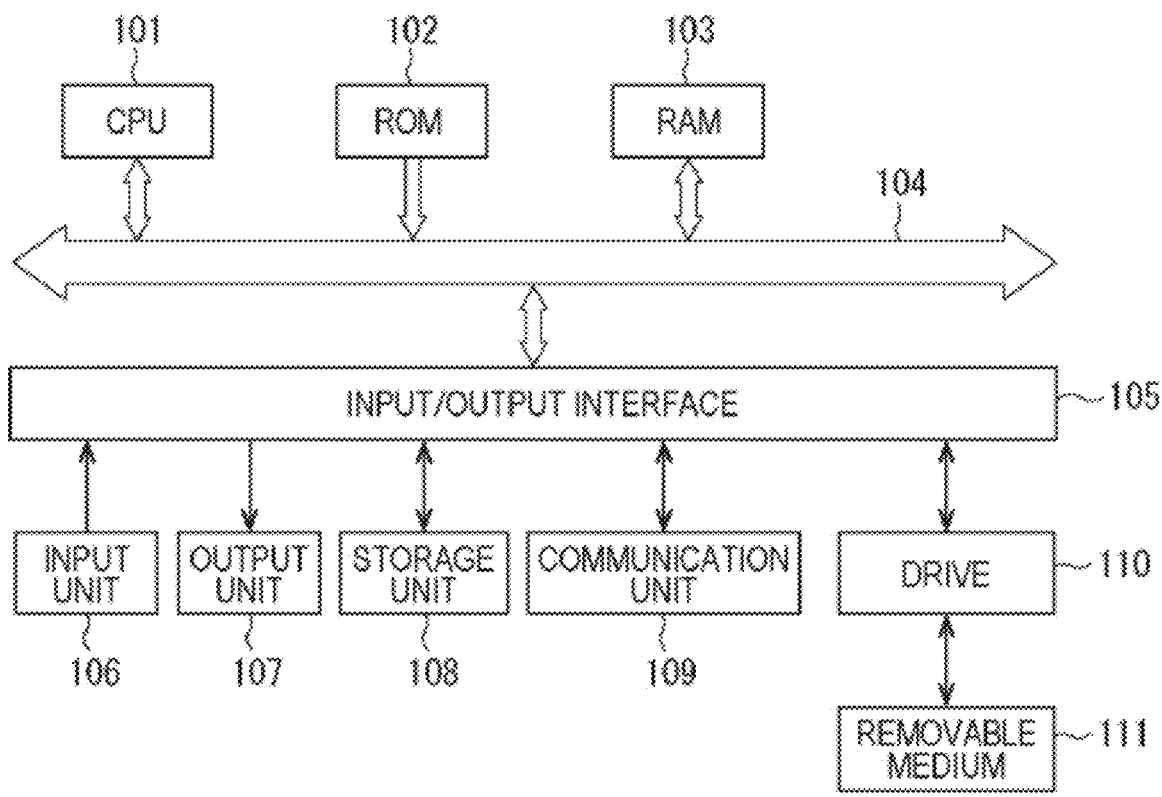
FIG. 17 is a block diagram illustrating a configuration example of a computer.

FIG. 17 is a block diagram illustrating a hardware configuration example of a computer constituting the color information providing server 1.

A central processing unit (CPU) 101, a read only memory (ROM) 102, and a random access memory (RAM) 103 are mutually connected by a bus 104.

The bus 104 is further connected with an input/output interface 105. The input/output interface 105 is connected with an input unit 106 including a keyboard, a mouse, and the like, and an output unit 107 including a display, a speaker, and the like. Furthermore, the input/output interface 105 is connected with a storage unit 108 including a hard disk, a non-volatile memory, and the like, a communication unit 109 including a network interface and the like, and a drive 110 that drives a removable medium 111.

For example, the CPU 101 executes a program stored in the storage unit 108 to implement each configuration of the color information providing server 1.

The color information providing server 1 may be configured by one computer having the configuration illustrated in FIG. 17 or may be configured by a plurality of computers.

Note that the mobile terminal 2 also has a configuration basically similar to the configuration illustrated in FIG. 17. When the configuration of FIG. 17 is used as the configuration of the mobile terminal 2, a CPU 101 of the mobile terminal 2 executes a program stored in a storage unit 108 to implement each configuration of the mobile terminal 2. For example, a communication unit 109 of the mobile terminal 2 communicates with the color information providing server 1 and the web server 12. The communication unit 109 functions as a communication unit that transmits a comparison object image to the color information providing server 1.

About Program

The series of processes described above can be executed by hardware or software. In a case of executing the series of processes by software, a program that forms the software is installed to a computer incorporated in dedicated hardware, to a general-purpose personal computer, or the like.

The program to be installed is provided by being recorded in the removable medium 111 illustrated in FIG. 17 including an optical disc (a compact disc-read only memory (CD-ROM), a digital versatile disc (DVD), or the like), a semiconductor memory, or the like. Furthermore, the program may be provided via a wired or wireless transmission medium such as a local area network, the Internet, or digital broadcasting. The program can be installed in advance in the ROM 102 and the storage unit 108.

Note that the program executed by the computer may be a program that performs processing in time series according to an order described in this specification, or may be a program that performs processing in parallel or at necessary timing such as when a call is made.

In this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

The effects described in this specification are merely examples and are not limited, and other effects may also be present.

The embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, when one step includes a plurality of processes, the plurality of processes included in the one step can be executed by one device, and also shared and executed by a plurality of devices.

Combination Example of Configuration

The present technology can also have the following configurations.

(1)

An information processing apparatus including:
a calculation unit configured to calculate a true value of a color of an object shown in a second image obtained by image capture in a user environment, on the basis of a model created on the basis of a first image obtained by image capture, in the user environment, of an object having a known true value of a color, the model representing a correspondence between a color space in the user environment and a color space of the known true value of the color.

(2)

The information processing apparatus according to (1), in which
the calculation unit calculates a true value of a color of a comparison object captured as an object for color comparison and shown in the second image, and
the information processing apparatus further includes a comparison unit configured to compare a true value of a color of the comparison object calculated on the basis of the model with a true value of a color of a target object to be a target of presentation of information regarding a color.

(3)

The information processing apparatus according to (2), in which
the comparison unit causes presentation of the information regarding a color of the target object to a user, on the basis of a comparison result between a true value of a color of the comparison object and a true value of a color of the target object.

(4)
The information processing apparatus according to (3), in which
the comparison unit causes presentation, to a user, of information regarding a color of the target object based on a color of the comparison object.

(5)
The information processing apparatus according to any one of (1) to (4), further including:
a model creation unit configured to create the model on the basis of a color of an object shown in the first image obtained by image capture in the user environment and on the basis of a true value of a color of the object shown in the first image.

(6)
The information processing apparatus according to (5), in which
the model creation unit creates the model by performing machine learning in which a true value of a color of an object shown in the first image is used as teacher data and a color of the object shown in the first image obtained by image capture in the user environment is used as student data.

(7)
The information processing apparatus according to (5), in which
the model creation unit creates, as the model, a conversion matrix that converts a color of an object shown in the first image obtained by image capture in the user environment into a true value of a color of the object shown in the first image.

(8)
The information processing apparatus according to any one of (5) to (7), further including:
an extraction unit configured to extract a color of a barycenter or a color of a position designated by a user, in an object shown in the first image obtained by image capture in the user environment, as a representative color of the object shown in the first image, in which
the model creation unit creates the model by using the representative color as a color of the object shown in the first image.

(9)
An information processing method including
by an information processing apparatus:
calculating a true value of a color of an object shown in a second image obtained by image capture in a user environment, on the basis of a model created on the basis of a first image obtained by image capture, in the user environment, of an object having a known true value of a color, the model representing a correspondence between a color space in the user environment and a color space of the known true value of the color.

(10)
A program for causing a computer to execute processing including:
calculating a true value of a color of an object shown in a second image obtained by image capture in a user environment, on the basis of a model created on the basis of a first image obtained by image capture, in the user environment, of an object having a known true value of a color, the model representing a correspondence between a color space in the user environment and a color space of the known true value of the color.

(11)
An information processing terminal including:
a communication unit configured to transmit a second image obtained by image capture of a comparison object that is an object for color comparison, to an information processing apparatus configured to calculate a true value of a color of an object shown in the second image obtained by image capture in a user environment, on the basis of a model created on the basis of a first image obtained by image capture, in the user environment, of an object having a known true value of a color, the model representing a correspondence between a color space in the user environment and a color space of the known true value of the color; and
a presentation unit configured to present, to a user, information regarding a color of a target object on the basis of a comparison result between a true value that is of a color of the comparison object and is calculated on the basis of the model and a true value of a color of the target object to be a target of presentation of information regarding a color, the comparison result being obtained by the information processing apparatus.

(12)
The information processing terminal according to (11), in which
the presentation unit presents, to a user, information regarding a color of the target object based on a color of the comparison object.

(13)
The information processing terminal according to (11), in which
the presentation unit presents information regarding a color of the target object to a user, by a character or a color displayed on a display, or sound outputted from a speaker.

(14)
An information processing method including
by an information processing terminal:
transmitting a second image obtained by image capture of a comparison object that is an object for color comparison, to an information processing apparatus configured to calculate a true value of a color of an object shown in the second image obtained by image capture in a user environment, on the basis of a model created on the basis of a first image obtained by image capture, in the user environment, of an object having a known true value of a color, the model representing a correspondence between a color space in the user environment and a color space of the known true value of the color; and
presenting, to a user, information regarding a color of a target object on the basis of a comparison result between a true value that is of a color of the comparison object and is calculated on the basis of the model and a true value of a color of the target object to be a target of presentation of information regarding a color, the comparison result being obtained by the information processing apparatus.

(15)
A program for causing a computer to execute processing including:
transmitting a second image obtained by image capture of a comparison object that is an object for color comparison, to an information processing apparatus configured to calculate a true value of a color of an object shown in the second image obtained by image capture in a user environment, on the basis of a model created on the basis of a first image obtained by image capture, in the user environment, of an object having a known true value of a color, the model representing a correspondence between a color space in the user environment and a color space of the known true value of the color; and presenting, to a user, information regarding a color of a target object on the basis of a comparison result between a true value that is of a color of the comparison object and is calculated on the basis of the model and a true value of a color of the target object to be a target of presentation of information regarding a color, the comparison result being obtained by the information processing apparatus.

REFERENCE SIGNS LIST

1 Color information providing server
2 Mobile terminal
51 Color information DB
52 General object subject recognition unit
53 Representative color extraction unit
54 Conversion model creation unit
55 Product subject recognition unit
56 Representative color designation unit
57 Comparison object color information calculation unit
58 Comparison unit
59 Information presentation unit

The invention claimed is:

1. An information processing apparatus, comprising:
a calculation unit configured to:
calculate a true value of a color of a comparison object, based on a model, shown in a first image obtained by a first image capture in a user environment, wherein
the comparison object is captured for a color comparison,
the model is based on a second image obtained by a second image capture, in the user environment, of an object having a known true value of a color of the object, and
the model represents a correspondence between a first color space in the user environment and a second color space of the known true value of the color; and
a comparison unit configured to compare the true value of the color of the comparison object calculated based on the model with a true value of a color of a target object, wherein the target object is a target of presentation of information comprising the color of the target object.

2. The information processing apparatus according to claim 1, wherein the comparison unit is further configured to control, based on a comparison result between the true value of the color of the comparison object and the true value of the color of the target object, the presentation of the information regarding the color of the target object to a user.

3. The information processing apparatus according to claim 2, wherein the comparison unit is further configured to control the presentation, to the user, of the information regarding the color of the target object based on the color of the comparison object.

4. The information processing apparatus according to claim 1, further comprising:
a model creation unit configured to create the model based on the color of the object shown in the second image obtained by the second image capture in the user environment and a true value of the color of the object shown in the second image.

5. The information processing apparatus according to claim 4, wherein the model creation unit is further configured to create the model based on machine learning in which the true value of the color of the object shown in the second image is used as teacher data and the color of the object shown in the second image obtained by the second image capture in the user environment is used as student data.

6. The information processing apparatus according to claim 4, wherein the model creation unit is further configured to create, as the model, a conversion matrix that converts the color of the object shown in the second image obtained by the second image capture in the user environment into the true value of the color of the object shown in the second image.

7. The information processing apparatus according to claim 4, further comprising:
an extraction unit configured to extract one of a color of a barycenter or a color of a position designated by a user, in the object shown in the second image obtained by the second image capture in the user environment, as a representative color of the object shown in the second image,
wherein the model creation unit is further configured to create the model based on the representative color as the color of the object shown in the second image.

8. An information processing method, comprising:
by an information processing apparatus:
calculating, by a calculation unit, a true value of a color of a comparison object, based on a model, shown in a first image obtained by a first image capture in a user environment, wherein
the comparison object is captured for a color comparison,
the model is based on a second image obtained by a second image capture, in the user environment, of an object having a known true value of a color of the object, and
the model represents a correspondence between a first color space in the user environment and a second color space of the known true value of the color; and
comparing, by a comparison unit, the true value of the color of the comparison object calculated based on the model with a true value of a color of a target object, wherein the target object is a target of presentation of information comprising the color of the target object.

9. A non-transitory computer-readable medium having stored thereon computer-executable instructions that, when executed by a processor, cause the processor to execute operations, the operations comprising:
calculating a true value of a color of a comparison object, based on a model, shown in a first image obtained by a first image capture in a user environment, wherein
the comparison object is captured for a color comparison,
the model is based on a second image obtained by a second image capture, in the user environment, of an object having a known true value of a color of the object, and
the model represents a correspondence between a first color space in the user environment and a second color space of the known true value of the color; and
comparing the true value of the color of the comparison object calculated based on the model with a true value of a color of a target object, wherein the target object is a target of presentation of information comprising the color of the target object.

10. An information processing terminal, comprising:
a communication unit configured to transmit, to an information processing apparatus, a first image obtained by a first image capture of a comparison object, wherein
the comparison object is for a color comparison,
the information processing apparatus calculates a true value of a color of the comparison object, based on a model, shown in the first image obtained by the first image capture in a user environment,
the model is based on a second image obtained by a second image capture, in the user environment, of an object having a known true value of a color of the object, and
the model represents a correspondence between a first color space in the user environment and a second color space of the known true value of the color; and
a presentation unit configured to present, to a user, information regarding a color of a target object based a comparison result between the true value of the color of the comparison object and a true value of the color of the target object, wherein
the target object is a target of the presentation of the information comprising the color of the target object,
the comparison result is calculated based on the model, and
the comparison result is obtained by the information processing apparatus.

11. The information processing terminal according to claim 10, wherein the presentation unit is further configured to present, to the user, the information regarding the color of the target object based on the color of the comparison object.

12. The information processing terminal according to claim 10, wherein the presentation unit is further configured to present the information regarding the color of the target object to the user, by at least one of a character or a color displayed on a display, or sound outputted from a speaker.

13. An information processing method, comprising by an information processing terminal:
transmitting, to an information processing apparatus, a first image obtained by a first image capture of a comparison object, wherein
the comparison object is for a color comparison,
the information processing apparatus calculates a true value of a color of the comparison object, based on a model, shown in the second first image obtained by the first image capture in a user environment,
the model is based on a second image obtained by a second image capture, in the user environment, of an object having a known true value of a color of the object, and
the model represents a correspondence between a first color space in the user environment and a second color space of the known true value of the color; and
presenting, to a user, information regarding a color of a target object based on a comparison result between the true value that is of the color of the comparison object and a true value of the color of the target object, wherein
the target object is a target of the presentation of the information comprising the color of the target object,
the comparison result is calculated based on the model, and
the comparison result is obtained by the information processing apparatus.

14. A non-transitory computer-readable medium having stored thereon computer-executable instructions that, when executed by a processor, cause the processor to execute operations, the operations comprising:
transmitting, to an information processing apparatus, a first image obtained by a first image capture of a comparison object, wherein
the comparison object is for a color comparison,
the information processing apparatus calculates a true value of a color of the comparison object, based on a model, shown in the first image obtained by the first image capture in a user environment,
the model is based a second image obtained by a second image capture, in the user environment, of an object having a known true value of a color of the object, and
the model represents a correspondence between a first color space in the user environment and a second color space of the known true value of the color; and
presenting, to a user, information regarding a color of a target object based on a comparison result between the true value of the color of the comparison object and a true value of the color of the target object, wherein
the target object is a target of the presentation of the information comprising the color of the target object,
the comparison result is calculated based on the model, and
the comparison result is obtained by the information processing apparatus.

* * * * *